United States Patent
Hausler et al.

(10) Patent No.: US 10,580,012 B2
(45) Date of Patent: Mar. 3, 2020

(54) ARTICLE-SUGGESTION SYSTEM FOR AUTOMATICALLY RESOLVING CUSTOMER-SERVICE REQUESTS

(71) Applicant: Zendesk, Inc., San Francisco, CA (US)

(72) Inventors: Christopher J. Hausler, Coburg (AU); Michael G. Mortimer, Croydon Hills (AU); Thomas Pelletier, Montpellier (FR); Arwen Twinkle E. Griffioen, Montmorency (AU); Soon-Ee Cheah, Bentleigh East (AU); Anh Thien Dinh, Pascoe Vale (AU); Arvind Kunday Anantharaman, Melbourne (AU); Bob Dharmendra Raman, Melbourne (AU); Jason Edward Maynard, San Francisco, CA (US); Wai Chee Yau, Caulfield (AU); Sean D. Caffery, Collingwood (AU); Jeffrey P. Theobald, Southbank (AU); Damen Turnbull, San Francisco, CA (US)

(73) Assignee: Zendesk, Inc., San Francisco, CA (US)

( * ) Notice: Subject to any disclaimer, the term of this patent is extended or adjusted under 35 U.S.C. 154(b) by 43 days.

(21) Appl. No.: 15/607,318

(22) Filed: May 26, 2017

(65) Prior Publication Data
US 2017/0286972 A1 Oct. 5, 2017

Related U.S. Application Data

(63) Continuation of application No. 15/087,755, filed on Mar. 31, 2016.

(51) Int. Cl.
| | | |
|---|---|---|
| G06Q 30/00 | (2012.01) | |
| G06Q 30/02 | (2012.01) | |
| G06N 3/04 | (2006.01) | |
| G06F 16/33 | (2019.01) | |
| G06Q 10/02 | (2012.01) | |

(52) U.S. Cl.
CPC ....... *G06Q 30/016* (2013.01); *G06F 16/3347* (2019.01); *G06N 3/0445* (2013.01); *G06Q 30/0282* (2013.01); *G06Q 10/02* (2013.01)

(58) Field of Classification Search
CPC ........... G06Q 30/016; G06F 17/30867; G06F 16/3347
See application file for complete search history.

(56) References Cited

U.S. PATENT DOCUMENTS

2006/0095521 A1 * 5/2006 Patinkin ............... G06Q 10/107 709/206
2014/0052645 A1 2/2014 Hawes
(Continued)

OTHER PUBLICATIONS

Mikolov et al.; "Efficient Estimation of Word Representation in Vector Space", arXiv:1301378v3 [cs.CL] Sep. 7, 2013.
(Continued)

*Primary Examiner* — Maria C Santos-Diaz
(74) *Attorney, Agent, or Firm* — Park, Vaughan, Fleming & Dowler LLP

(57) ABSTRACT

The disclosed embodiments relate to a system that suggests helpful articles to resolve a customer request. During operation, the system receives the customer request, wherein the customer request is associated with a product or a service used by the customer. Next, the system feeds a set of words from the customer request through a model to generate a request vector comprising numerical values representing words in the customer request. The system then compares the request vector against article vectors representing articles in a set of help center articles to determine whether the customer request matches one or more help center articles. If the customer request matches one or more help center articles, the system presents the one or more help center articles to the customer to facilitate automatically resolving the customer request.

25 Claims, 5 Drawing Sheets

(56) References Cited

U.S. PATENT DOCUMENTS

| | | |
|---|---|---|
| 2015/0222752 A1 | 8/2015 | Fehr |
| 2015/0269586 A1 | 9/2015 | Garia |
| 2016/0259789 A1* | 9/2016 | Shrinath ............. G06F 17/3053 |
| 2016/0328388 A1* | 11/2016 | Cao ....................... G10L 15/063 |
| 2016/0379124 A1 | 12/2016 | Brunet |
| 2017/0019356 A1 | 1/2017 | Gilbert |
| 2017/0060366 A1* | 3/2017 | Alexander .......... G06F 11/3089 |
| 2017/0091844 A1 | 3/2017 | Yarvis |
| 2017/0169475 A1* | 6/2017 | Korpusik ........... G06Q 30/0269 |
| 2017/0221015 A1* | 8/2017 | June ..................... G06N 99/005 |
| 2018/0075457 A9* | 3/2018 | Van Buskirk ........ G06Q 30/016 |
| 2018/0096060 A1* | 4/2018 | Peled .................... G06F 16/353 |

OTHER PUBLICATIONS

Srivastava et al.; "Dropout: A Simple Way to Prevent Neural Networks from Overfilling", Journal of Machine Learning Research 15 (2014) 1929-1958, submitted Nov. 2013; Published Jun. 2014.

Ester et al.; "A Density-Based Algorithm for Discovering Clusters in Large Spatial Databases with Noise", Published in the Proceedings of 2nd International Conference on Knowledge Discovery of Data Mining (KDD-96) 1996.

Lashinsky; "This startup is Zen about the competition", published on Fortune.com, Jun. 10, 2014.

Le et al.; "Distributed Representations of Sentences and Documents", Proceedings of the 31st International Conference on Machine Learning, Beijing, China May 22, 2014.

Mikolov et al.; "Distributed Representations of Words and Phrases and their Compositionality", Oct. 16, 2013.

Mnih et al.; "A fast and simple algorithm for training neural probablistic language models", Proceedings of the 29th International Conference on Machine Learning, Edinburgh, Scotland, UK Copyright 2012.

Morin et al.; "Hierarchical Probabilistic Neural Network Language Model", AISTATS'05.

Wang et al; "Relevance Feedback Exploiting Query-Specific Document Manifolds", Oct. 1, 2011.

Wen et al.; "Clustering User Queries of a Search Engine", WWW10, May 1-5, 2001, Hong Kong, ACM 1-58113-348-0/01/0005.

* cited by examiner

ARTICLE-SUGGESTION SYSTEM FOR AUTOMATICALLY RESOLVING CUSTOMER-SERVICE REQUESTS

RELATED APPLICATION

This application is a continuation-in-part of, and hereby claims priority under 35 U.S.C. § 120 to, pending U.S. patent application Ser. No. 15/087,755, entitled "Answer Suggestion System for Automatically Resolving Customer Requests," by inventor Thomas Pelletier, filed on 31 Mar. 2016.

BACKGROUND

Field

The disclosed embodiments generally relate to computer-based applications that help businesses in managing customer-service interactions. More specifically, the disclosed embodiments relate to an article-suggestion system that automatically suggests help center articles for customers to read to facilitate resolving customer-service requests.

Related Art

As electronic commerce continues to proliferate, customers are beginning to use online customer-service resources to solve problems, or to obtain information related to various products or services. These online customer-service resources commonly include ticketing systems, product-related knowledge bases, and online chat systems that are designed to help customers resolve their problems, either by providing information to the customers, or by facilitating online interactions with customer-support agents.

When designed properly, these online customer-service resources can automate customer-service interactions, thereby significantly reducing a company's customer-service costs. Research has shown that customers can be satisfied with self-service solutions to their problems, for example by receiving articles containing information that can be used to resolve their problem, especially if the request can be resolved in minutes, as opposed to hours or days if the request is answered by a human customer-support agent.

Hence, what is needed is a customer-service system that automatically resolves customer-service requests by suggesting articles containing helpful information.

SUMMARY

The disclosed embodiments relate to a system that suggests helpful articles to resolve a customer request. During operation, the system receives the customer request, wherein the customer request is associated with a product or a service used by the customer. Next, the system feeds a set of words from the customer request through a model to generate a request vector comprising numerical values representing words in the customer request. The system then compares the request vector against article vectors representing articles in a set of help center articles to determine whether the customer request matches one or more help center articles. If the customer request matches one or more help center articles, the system presents the one or more help center articles to the customer to facilitate automatically resolving the customer request.

In some embodiments, while generating the request vector, the system first obtains a set of words from the customer request. Next, the system generates a word vector for each word in the set of words, thereby producing a set of word vectors. The system then feeds the set of word vectors through a recurrent neural network to produce a preliminary request vector representing the customer request. Finally, the system feeds the preliminary request vector through a feed-forward neural network to produce the request vector.

In some embodiments, while obtaining the set of words from the customer request, the system first combines a subject field and a description field from the customer request into a blob of text. Next, the system feeds the blob of text through a regex processor to remove text that does not comprise words to produce a refined blob of text. Finally, the system selects the set of words from the refined blob of text.

In some embodiments, the system uses the Word2vec technique to generate the word vector for each word in the set of words.

In some embodiments, the recurrent neural network comprises a long short-term memory (LSTM) network.

In some embodiments, the feed-forward neural network modifies the preliminary request vector in a manner that moves request vectors and article vectors for responsive articles closer together.

In some embodiments, while comparing the request vector against the article vectors, the system calculates cosine distances between the request vector and the article vectors.

In some embodiments, prior to receiving the customer request, the system trains the model used to generate the request vector and the article vectors. During this training process, the system initially trains the model on a first set of customer requests and responsive textual responses from customer support agents that successfully resolved the first set of customer requests. The system then refines the initially trained model based on a second set of customer requests and responsive articles that successfully resolved the second set of customer requests.

In some embodiments, upon receiving notice of a change to an article in the set of help center articles, the system includes the changed article in the set of help center articles, and also updates the model used to generate the request vector and the article vectors based on the changed article.

In some embodiments, upon receiving notice of a new article to be included in the set of help center articles, the system includes the new article in the set of help center articles, and also updates the model used to generate the request vector and the article vectors based on the new article.

In some embodiments, the system receives feedback from the customer regarding whether the one or more help center articles were helpful in resolving the customer request. The system then uses this feedback to update the model used to generate the request vector and the article vectors.

In some embodiments, the customer request includes a question from the customer about the product or the service used by the customer.

In some embodiments, the customer request comprises a ticket associated with a customer issue in a help center ticketing system.

In some embodiments, the set of help center articles comprises client-specific articles associated with a client's account.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
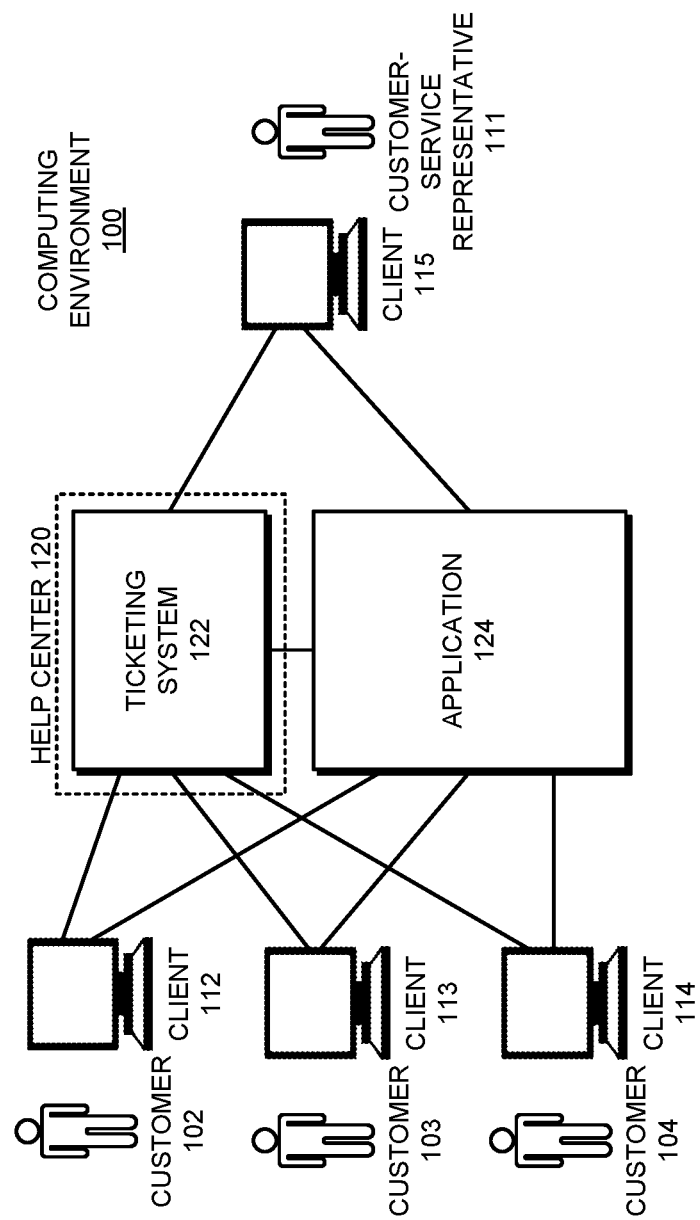
FIG. 1 illustrates a computing environment including an application and associated ticketing system in accordance with the disclosed embodiments.

FIG. 1 illustrates a computing environment 100 including an application 124 and ticketing system 122 in accordance with the disclosed embodiments. Within computing environment 100, a number of customers 102-104 interact with application 124 through client computer systems 112-114, respectively. Application 124 is provided by an organization, such as a commercial enterprise, to enable customers 102-104 to perform various operations associated with the organization, or to access one or more services provided by the organization. For example, application 124 can include online accounting software that customers 102-104 can access to prepare and file tax returns online. In another example, application 124 provides a commercial website for selling sporting equipment. Note that application 124 can be hosted on a local or remote server.

If customers 102-104 have problems or questions about application 124, they can access a help center 120 to obtain help in dealing with issues, which can include various problems and questions. For example, a user of accounting software may need help in using a feature of the accounting software, or a customer of a website that sells sporting equipment may need help in cancelling an order that was erroneously entered. This help may be provided by a customer-service representative 111 who operates a client computer system 115 and interacts with customers 102-104 through help center 120. This help may also comprise automatically suggested helpful articles that the customer can read to hopefully resolve the problem or question. Note that customer-service representative 111 can access application 124 (either directly or indirectly through help center 120) to help resolve an issue.

In some embodiments, help center 120 is not associated with computer-based application 124, but is instead associated with another type of product or service that is offered to a customer. For example, help center 120 can provide assistance with a product, such as a television, or with a service such as a package-delivery service.

Help center 120 organizes customer issues using a ticketing system 122, which generates tickets to represent each customer issue. Ticketing systems are typically associated with a physical or virtual "help center" (or "help desk") for resolving customer problems. Note that, although the present invention is described with reference to a ticketing system, it is not meant to be limited to customer-service interactions involving ticketing systems. In general, the invention can be applied to any type of system that enables a customer to resolve a problem with a product or service provided by an organization.

Ticketing system 122 comprises a set of software resources that enable a customer to resolve an issue. In the illustrated embodiment, specific customer issues are associated with abstractions called "tickets," which encapsulate various data and metadata associated with the customer requests to resolve an issue. (Within this specification, tickets are more generally referred to as "customer requests.") An exemplary ticket can include a ticket identifier, and information (or links to information) associated with the problem. For example, this information can include: (1) information about the problem; (2) customer information for one or more customers who are affected by the problem; (3) agent information for one or more customer-service agents who are interacting with the customer; (4) email and other electronic communications about the problem (which, for example, can include a question posed by a customer about the problem); (5) information about telephone calls associated with the problem; (6) timeline information associated with customer-service interactions to resolve the problem, including response times and resolution times, such as a first reply time, a time to full resolution and a requester wait time; and (7) effort metrics, such as a number of communications or responses by a customer, a number of times a ticket has been reopened, and a number of times the ticket has been reassigned to a different customer-service agent.

Article-Suggestion System

Figure 2:
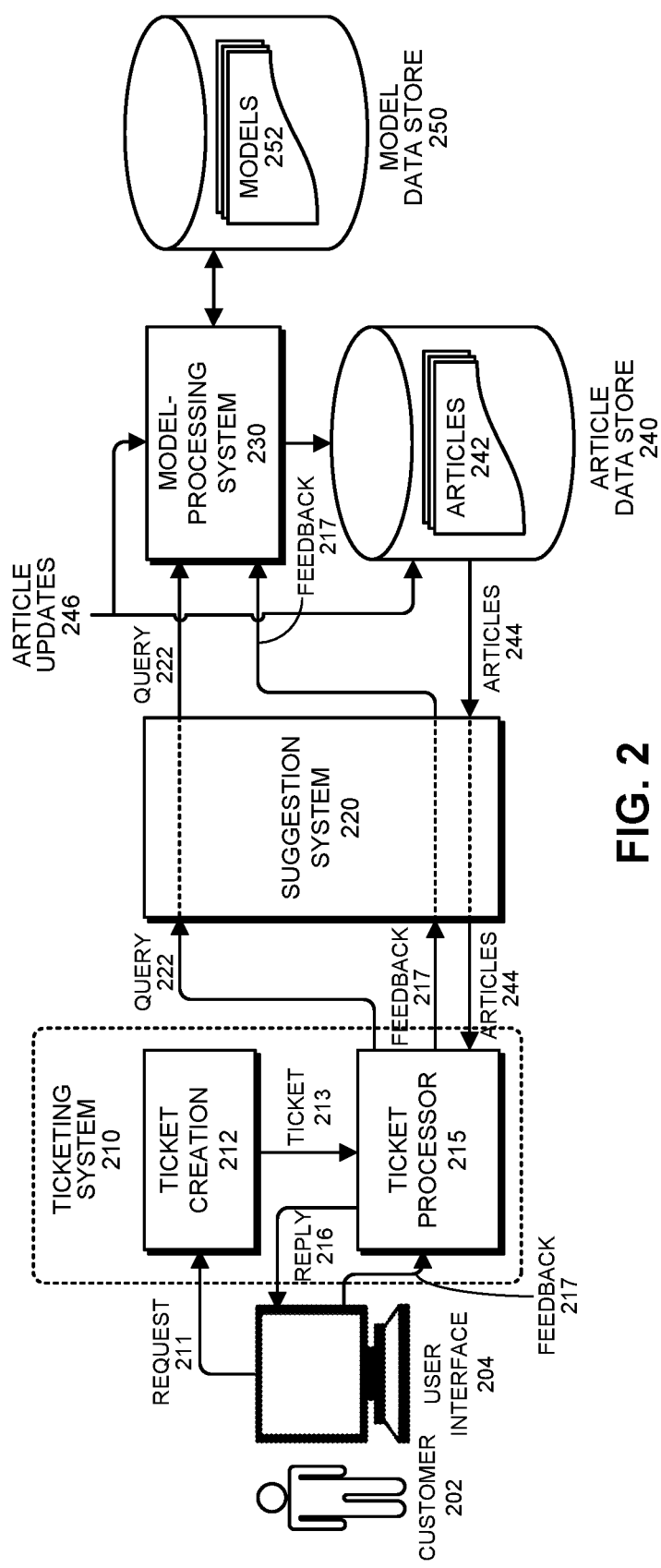
FIG. 2 illustrates system components involved in the article-suggestion process in accordance with the disclosed embodiments.

FIG. 2 illustrates various system components involved in the article-suggestion process in accordance with the disclosed embodiments. The process starts with a ticket-creation operation 212 that takes place within ticketing system 210. This ticket-creation operation is triggered by actions of a customer 202 who has an issue with a product or a service, and submits a request 211 to obtain help with the issue. Note that customer 202 can submit request 211 through a number of possible channels, including through email, online forms, social networking sites, etc. In response to request 211, the ticket-creation operation 212 produces a ticket 213 that feeds into a ticket processor 215.

Next, ticket processor 215 sends a query 222, which is associated with the customer request 211 and the corresponding ticket 213, to a suggestion system 220. Then suggestion system 220 forwards query 222 to a model-processing system 230, to obtain a set of suggested articles. In response to query 222, model-processing system 230 uses various machine-learning techniques based on models 252 contained in a model data store 250 to identify a set of helpful articles 242 from a set of help center articles contained in an article data store 240. The identified helpful articles 244 are then returned to suggestion system 220. Next, suggestion system 220 returns the articles 244 to ticket processor 215, which sends a reply 216 containing the suggested articles 244 to a user interface 204 to be displayed to customer 202. Note that user interface 204 can be implemented in a number of different ways for both mobile and desktop platforms. For example, user interface 204 can be incorporated into: a web page, an email, or a UI screen provided by an application.

Next, customer 202 can provide feedback 217 about the suggested articles 244 indicating whether the suggested articles 244 were helpful or not, and this feedback 217 is propagated back through ticket processor 215 to model-processing system 230, wherein the feedback 217 can be used to update models 252 to make better predictions about which articles are most helpful for resolving a specific issue.

Article-Suggestion Process

Figure 3:
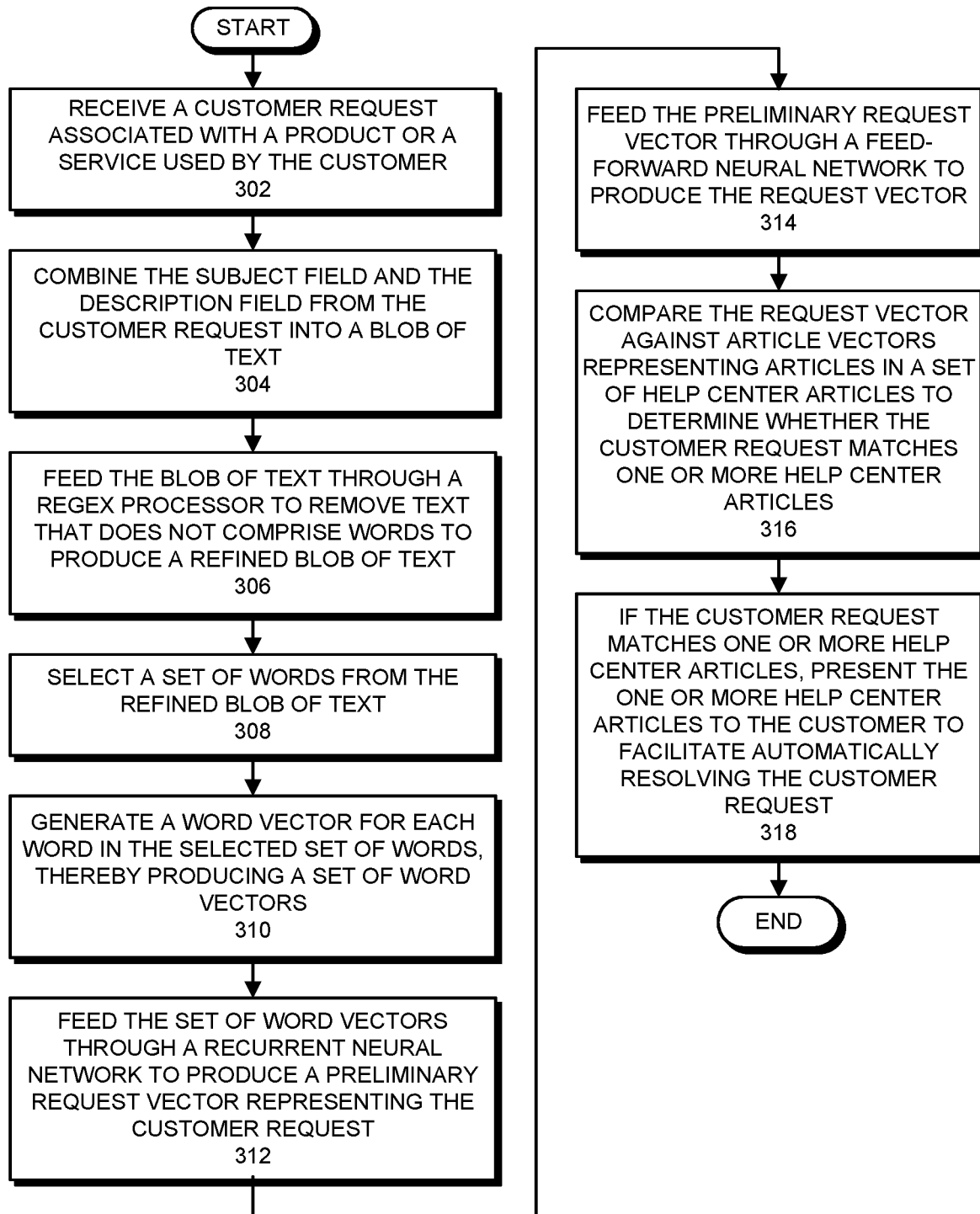
FIG. 3 presents a flow chart illustrating the article-suggestion process in accordance with the disclosed embodiments.

FIG. 3 presents a flow chart illustrating the article-suggestion process in accordance with the disclosed embodiments. Note that this process is performed by model-processing system 230, which receives a query 222 that contains customer request 211 as is illustrated in FIG. 2. At the start of this process, the system receives the customer request 211, wherein the customer request 211 is associated with a product or a service used by the customer (step 302).

Next, the system selects a set of words from the customer request 211. During this word-selection process, the system combines a subject field and a description field from the customer request 211 into a blob of text (step 304). The system then feeds the blob of text through a regex processor to remove text that does not comprise words to produce a refined blob of text (step 306). More specifically, the regex processor strips out textual items the system does not care about, such as numbers or email addresses. Finally, the system selects the set of words from the refined blob of text (step 308). In an exemplary embodiment, the system selects 75 words from the refined blob of text to form the set of words.

The system then generates a "request vector" from the selected set of words. During this process, the system generates a word vector for each word in the selected set of words, thereby producing a set of word vectors (step 310). In an exemplary embodiment, the system uses the Word2vec model to produce each word vector. (See Mikolov, Tomas; et al. "Efficient Estimation of Word Representations in Vector Space". arXiv:1301.3781.) The system then feeds the set of word vectors through a recurrent neural network to produce a preliminary request vector representing the customer request (step 312). In an exemplary embodiment, the recurrent neural network comprises a long short-term memory (LSTM) network. In this embodiment, the system feeds the set of word vectors through the LSTM in both a forward direction and a backward direction and then averages the resulting representations to produce the preliminary request vector. At a conceptual level, the LSTM learns the context of a document by reading it one word at a time. Note that by processing the set of word vectors in both forward and backward directions, the system mitigates the LSTM's tendency to forget older words. Finally, the system feeds the preliminary request vector through a feed-forward neural network to produce the request vector (step 314). In an exemplary embodiment, the feed-forward neural network comprises a fully connected feed-forward neural network with one layer. Note that this feed-forward neural network has been trained to move request vectors and article vectors for responsive articles closer together.

Note that article vectors are produced in the same way as request vectors. For example, in an exemplary embodiment, 75 words are selected from the title and abstract of an article, and these 75 words are similarly processed using the Word2vec model, the LSTM network and the feed-forward neural network.

The system then compares the request vector against article vectors representing articles in a set of help center articles to determine whether the customer request matches one or more help center articles (step 316). In an exemplary embodiment, while comparing the request vector against the article vectors, the system calculates cosine distances between the request vector and the article vectors, and then uses the cosine distance to determine whether the customer request matches one or more help center articles. If no articles are close enough to matching the customer request based on a cosine distance threshold, the system does not return any articles.

If the customer request matches one or more help center articles, the system presents the one or more help center articles to the customer to facilitate automatically resolving the customer request (step 318).

Handling Customer Feedback

Figure 4A:
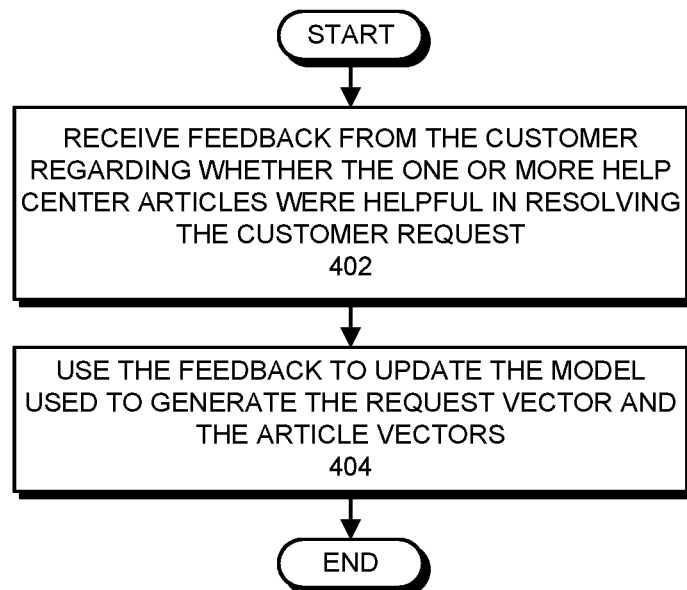
FIG. 4A presents a flow chart illustrating how customer feedback is processed in accordance with the disclosed embodiments.

FIG. 4A presents a flow chart illustrating how customer feedback can be processed in accordance with the disclosed embodiments. At the start of this process, the system receives feedback from the customer regarding whether the one or more help center articles were helpful in resolving the customer request (step 402). The system then uses this feedback to update the model used to generate the request vector and the article vectors (step 404).

Handling Article Updates

Figure 4B:
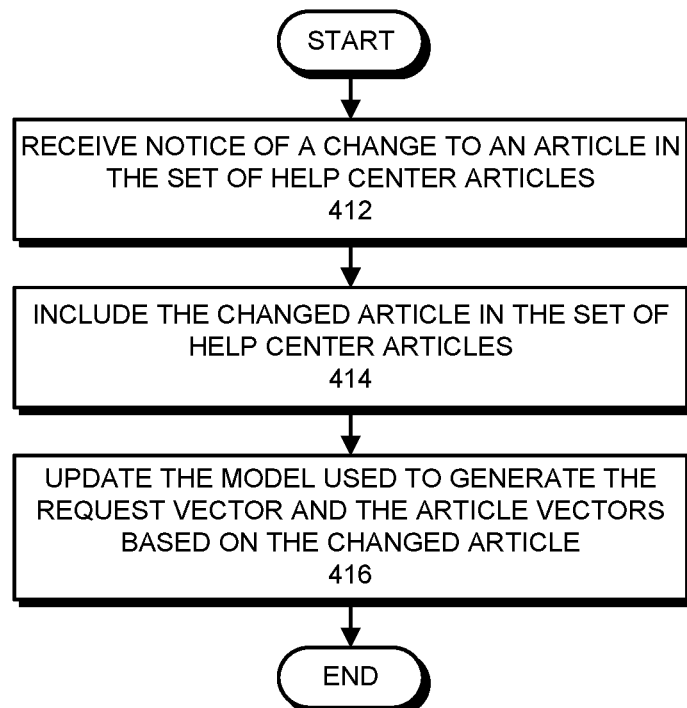
FIG. 4B presents a flow chart illustrating how article updates are processed in accordance with the disclosed embodiments.

FIG. 4B presents a flow chart illustrating how article updates are processed in accordance with the disclosed embodiments. The system first receives notice of a change to an article in the set of help center articles (step 412). In an exemplary embodiment, the system has a listener, which listens to help center updates and publishes any changes to articles or new articles. Next, the system includes the changed article in the set of help center articles, (step 414), and also updates the model used to generate the request vector and the article vectors based on the changed article (step 416).

Figure 4C:
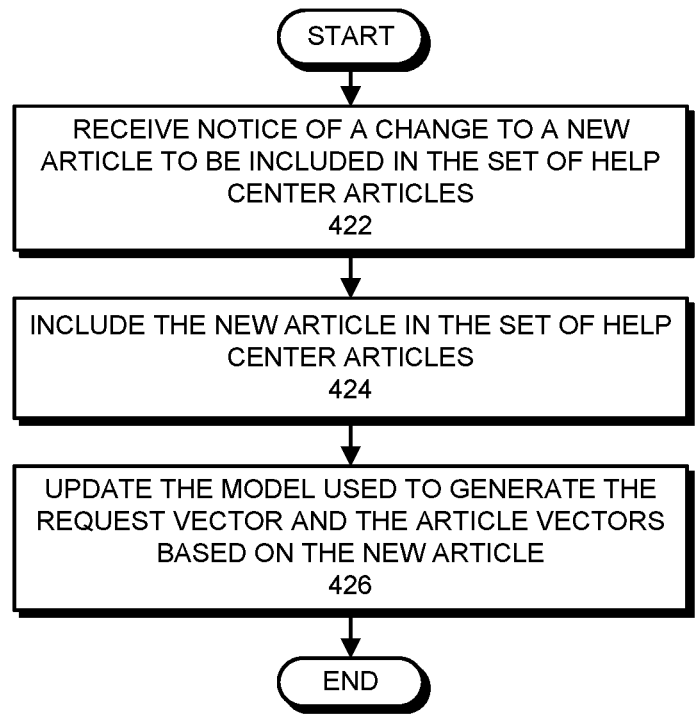
FIG. 4C presents a flow chart illustrating how new articles are processed in accordance with the disclosed embodiments.

FIG. 4C presents a flow chart illustrating how new articles are processed in accordance with the disclosed embodiments. First, the system receives notice of a new article to be included in the set of help center articles (step 422). Next, the system includes the new article in the set of help center articles (step 424), and also updates the model used to generate the request vector and the article vectors based on the new article (step 426).

Training Process

Figure 4D:
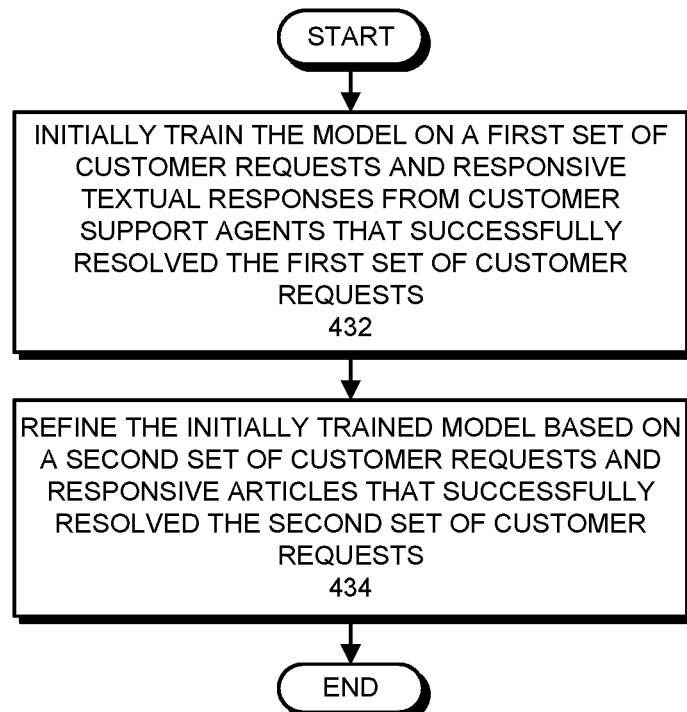
FIG. 4D presents a flow chart illustrating a training process for the system in accordance with the disclosed embodiments.

FIG. 4D presents a flow chart illustrating the training process for the article-suggestion system in accordance with the disclosed embodiments. Before receiving customer requests, the system trains the model used to generate the request vector and the article vectors. During this training process, the system initially trains the model on a first set of customer requests and responsive textual responses from customer support agents that successfully resolved the first set of customer requests (step 432). The system then refines the initially trained model based on a second set of customer requests and responsive articles that successfully resolved the second set of customer requests (step 434).

Note that instead of training the model solely based on pairs of tickets and responsive help center articles, we initially train the model based on tickets that have received textual responses from a customer support agent and have received good customer satisfaction ratings. In doing so, we try to learn a mapping between the support tickets and the agent's textual responses. We then use "transfer learning" to take this initially trained model and refine it using examples where an agent has actually used a help center article to resolve a ticket. The reason we do this is because we have a far larger corpus of data for cases where the customer support agent successfully resolved a ticket using textual responses than we do for cases wherein the customer support agent used a help center article to resolve a ticket. In this way, we can leverage all of the data related to resolving tickets, instead of relying on the smaller subset of cases involving help center articles.

Note that while training the recurrent neural network, the system can use the "dropout" technique to prevent overfitting by randomly dropping units (along with their connections) from the neural network during training. (See "Dropout: A Simple Way to Prevent Neural Networks from Overfitting," Nitish Journal of Machine Learning Research 15 (2014) 1929-1958, et al., Journal of Machine Learning Research 15 (2014) 1929-1958.)

Moreover, while training the feed-forward neural network, the system can update the feed-forward network by using a loss function and a gradient descent technique to update parameters in the feed-forward neural network so that tickets and responsive articles move closer together, and tickets and articles that do not solve the problem move farther apart.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for automatically suggesting helpful articles to resolve a customer request, comprising:
   receiving, by a ticketing system, the customer request, wherein the customer request is associated with a product or a service;
   feeding words from the customer request through a model to generate a request vector representing words in the customer request;
   wherein generating the request vector comprises,
      obtaining a set of words from the customer request by combining a subject field and a description field from the customer request into a blob of text, feeding the blob of text through a regex processor to remove text that does not comprise words to produce a refined blob of text, and selecting a new set of words from the refined blob of text,
      producing a set of word vectors by generating a word vector for each word in the new set of words,
      feeding the set of word vectors through a recurrent neural network to produce a preliminary request vector representing the customer request, and
      feeding the preliminary request vector through a feed-forward neural network to generate the request vector;
   comparing the request vector against article vectors representing articles in a set of help center articles to determine whether the customer request matches one or more help center articles; and
   presenting the one or more help center articles to a customer to facilitate automatically resolving the customer request when the customer request matches one or more help center articles.

2. The method of claim 1, wherein generating the word vector for each word in the new set of words involves using the Word2vec technique to generate the word vector for each word in the new set of words.

3. The method of claim 1, wherein feeding the set of word vectors through the one or more neural networks comprises:
   feeding the set of word vectors through a recurrent neural network to produce a preliminary request vector representing the customer request; and
   feeding the preliminary request vector through a feed-forward neural network to produce the request vector.

4. The method of claim 3, wherein the recurrent neural network comprises a long short-term memory (LSTM) network; and
   wherein the feed-forward neural network modifies the preliminary request vector in a manner that moves request vectors and article vectors for responsive articles closer together.

5. The method of claim 1, wherein comparing the request vector against the article vectors involves calculating cosine distances between the request vector and the article vectors.

6. The method of claim 1, wherein prior to receiving the customer request, the method further comprises training the model used to generate the request vector and the article vectors, by:
   initially training the model on a first set of customer requests and responsive textual responses from customer support agents that successfully resolved the first set of customer requests; and refining the initially trained model based on a second set of customer requests and responsive articles that successfully resolved the second set of customer requests.

7. The method of claim 1, wherein the method further comprises:
upon receiving notice of a change to an article in the set of help center articles, including the changed article in the set of help center articles and updating the model used to generate the request vector and the article vectors based on the changed article.

8. The method of claim 1, wherein the method further comprises:
upon receiving notice of a new article to be included in the set of help center articles, including the new article in the set of help center articles and updating the model used to generate the request vector and the article vectors based on the new article.

9. The method of claim 1, wherein the method further comprises:
receiving feedback from the customer regarding whether the one or more help center articles were helpful in resolving the customer request; and
using the feedback to update the model used to generate the request vector and the article vectors.

10. The method of claim 1, wherein the customer request includes a question from the customer about the product or the service used by the customer.

11. The method of claim 1, wherein the customer request comprises a ticket associated with a customer issue in a help center ticketing system.

12. The method of claim 1, wherein the set of help center articles comprises client-specific articles associated with a client's account.

13. A non-transitory computer-readable storage medium storing instructions that when executed by a computer cause the computer to perform a method for automatically suggesting helpful articles to resolve a customer request, the method comprising:
receiving the customer request by the computer, wherein the customer request is associated with a product or a service;
feeding words from the customer request through a model to generate a request vector representing words in the customer request;
wherein generating the request vector comprises;
obtaining a set of words from the customer request, by combining a subject field and a description field from the customer request into a blob of text, feeding the blob of text through a regex processor to remove text that does not comprise words to produce a refined blob of text, and selecting a new set of words from the refined blob of text,
producing a set of word vectors by generating a word vector for each word in the new set of words,
feeding the set of word vectors through a recurrent neural network to produce a preliminary request vector representing the customer request, and
feeding the preliminary request vector through a feed-forward neural network to generate the request vector;
comparing the request vector against article vectors representing articles in a set of help center articles to determine whether the customer request matches one or more help center articles; and
presenting the one or more help center articles to a customer to facilitate automatically resolving the customer request when the customer request matches one or more help center articles.

14. The non-transitory computer-readable storage medium of claim 13, wherein generating the word vector for each word in the new set of words involves using the Word2vec technique to generate the word vector for each word in the new set of words.

15. The non-transitory computer-readable storage medium of claim 13, wherein feeding the set of word vectors through the one or more neural networks comprises:
feeding the set of word vectors through a recurrent neural network to produce a preliminary request vector representing the customer request; and
feeding the preliminary request vector through a feed-forward neural network to produce the request vector.

16. The non-transitory computer-readable storage medium of claim 15, wherein the recurrent neural network comprises a long short-term memory (LSTM) network; and
wherein the feed-forward neural network modifies the preliminary request vector in a manner that moves request vectors and article vectors for responsive articles closer together.

17. The non-transitory computer-readable storage medium of claim 13, wherein comparing the request vector against the article vectors involves calculating cosine distances between the request vector and the article vectors.

18. The non-transitory computer-readable storage medium of claim 13, wherein prior to receiving the customer request, the method further comprises training the model used to generate the request vector and the article vectors, by:
initially training the model on a first set of customer requests and responsive textual responses from customer support agents that successfully resolved the first set of customer requests; and
refining the initially trained model based on a second set of customer requests and responsive articles that successfully resolved the second set of customer requests.

19. The non-transitory computer-readable storage medium of claim 13, wherein the method further comprises:
upon receiving notice of a change to an article in the set of help center articles, including the changed article in the set of help center articles and updating the model used to generate the request vector and the article vectors based on the changed article.

20. The non-transitory computer-readable storage medium of claim 13, wherein the method further comprises:
upon receiving notice of a new article to be included in the set of help center articles including the new article in the set of help center articles; and
updating the model used to generate the request vector and the article vectors based on the new article.

21. The non-transitory computer-readable storage medium of claim 13, wherein the method further comprises:
receiving feedback from the customer regarding whether the one or more help center articles were helpful in resolving the customer request; and
using the feedback to update the model used to generate the request vector and the article vectors.

22. The non-transitory computer-readable storage medium of claim 13, wherein the customer request includes a question from the customer about the product or the service used by the customer.

23. The non-transitory computer-readable storage medium of claim 13, wherein the customer request comprises a ticket associated with a customer issue in a help center ticketing system.

24. The non-transitory computer-readable storage medium of claim 13, wherein the set of help center articles comprises client-specific articles associated with a client's account.

25. A system that suggests helpful articles to automatically resolve a customer request, comprising:
- at least one processor and at least one associated memory; and
- a request-processing mechanism that executes on the at least one processor, wherein during operation, the request-processing mechanism:
- receives the customer request, wherein the customer request is associated with a product or a service;
- feeds words from the customer request through a model to generate a request vector representing words in the customer request;
- wherein generating the request vector comprises:
  - obtaining a set of words from the customer request, by combining a subject field and a description field from the customer request into a blob of text, feeding the blob of text through a regex processor to remove text that does not comprise words to produce a refined blob of text, and selecting a new set of words from the refined blob of text,
  - producing a set of word vectors by generating a word vector for each word in the new set of words,
  - feeding the set of word vectors through a recurrent neural network to produce a preliminary request vector representing the customer request, and
  - feeding the preliminary request vector through a feed-forward neural network to generate the request vector;
- compares the request vector against article vectors representing articles in a set of help center articles to determine whether the customer request matches one or more help center articles; and
- presents the one or more help center articles to the customer to facilitate automatically resolving the customer request when the customer request matches one or more help center articles.

* * * * *